No. 736,962. PATENTED AUG. 25, 1903.
H. C. HAM.
FERTILIZER ATTACHMENT FOR GRAIN DRILLS.
APPLICATION FILED SEPT. 27, 1902.
NO MODEL.
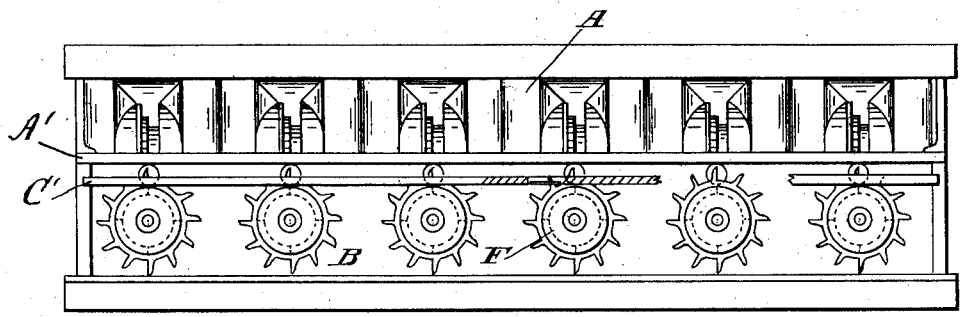
Fig. 1.
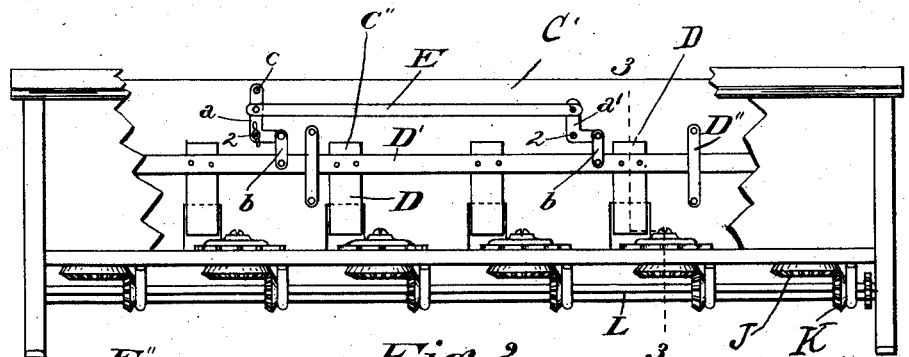
Fig. 2.
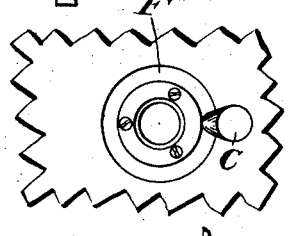
Fig. 5.
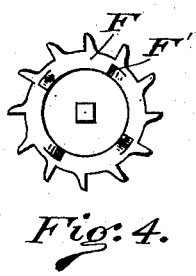
Fig. 4.
Fig. 3.
Witnesses
Inventor
Henry C. Ham
by his Attorneys No. 736,962.

Patented August 25, 1903.

UNITED STATES PATENT OFFICE.

HENRY C. HAM, OF LIBERTY, INDIANA, ASSIGNOR TO RUDE BROTHERS MANUFACTURING COMPANY, OF LIBERTY, INDIANA.

FERTILIZER ATTACHMENT FOR GRAIN-DRILLS.

SPECIFICATION forming part of Letters Patent No. 736,962, dated August 25, 1903.

Application filed September 27, 1902. Serial No. 125,089. (No model.)

*To all whom it may concern:*

Be it known that I, HENRY C. HAM, a citizen of the United States, and a resident of Liberty, in the county of Union and State of Indiana, have invented a certain new and useful Improvement in Fertilizer Attachments for Seed-Drills, of which the following is a full, clear, and exact description, reference being had to the accompanying drawings, which form part of this specification.

My invention relates to the fertilizer attachment of a seed-drill, and more particularly to the mechanism whereby the fertilizer is fed to the tube.

The object of my invention is to provide a positive force-feed with a cut-off so arranged that when some unusual substance—as, for example, a bone, a stone, or a loose nut which is too large to pass under the gate—is pushed forward by the feeding mechanism the gate will give for the moment and permit it to pass through without damaging the parts.

In fertilizer attachments for grain-drills as heretofore constructed considerable difficulty has been encountered by reason of the fact that when any such unusual hard substance as above mentioned came between the gates and the fingers of the feed-plates the slides or gates were broken by means of the strain thus produced and no provision was made for such a yielding of the gates. By the use of my construction, however, any such substance is readily permitted to pass through without interruption to the operation of the machine or damage to its parts.

My improved fertilizer attachment is preferably provided with adjustable gates or cut-offs, which regulate the rate of feed, the feed-plates having generally a constant speed of rotation for all rates of feed.

My invention also relates to the feed-plate or fertilizer-distributer and to the manner of mounting the same, whereby its bearing is made dust-proof, friction is reduced to a minimum, and the fertilizer is prevented from getting under the plate and clogging it, all of which will appear fully as I proceed with my specification.

In the drawings, Figure 1 is a top plan view of the hopper of a seed-drill, showing the fertilizer-hopper located adjacent to the said hopper in the usual manner. Fig. 2 is a front elevation of the same, with a portion of the box broken away in order to show the feeding mechanism; and Fig. 3 is a section of Fig. 2 on the line 3 3. Fig. 4 is a bottom plan view of the feed-plate. Fig. 5 is a plan view of a portion of the bottom of the hopper with the feed-plate removed.

A is the usual combined grain and fertilizer hopper divided near its middle by means of the fixed partition A'.

C represents openings in the bottom of the hopper, (the bottom being preferably of wood to prevent corrosion,) through which the fertilizer is fed to the grain-tubes.

C' is a removable partition, sliding in grooves at each end of the hopper and resting on the bottom thereof. This partition is cut away at the bottom to permit the feed-plates to work under it, as seen in Fig. 3, and is provided with a series of gateways C'', which are adapted to be closed by gates D, which are mounted on a bar D', working in guide-straps D'', which are so arranged as to permit the gates to be raised and lowered in such manner as to increase or diminish the size of the gateway. The gates D are set into the partition or cut-off board C', as seen at C''', which prevents them from wabbling and permits them to slide freely. The bar D', to which are attached the various gates, is operated by the bar E, which is pivoted to the levers $a\,a'$, the levers in turn being connected by the links $b\,b$ to the bar D'. The one lever $a$ has an upward extension, which is provided with a small grasp or handle $c$, by which the levers are operated. The levers $a$ and $a'$ are preferably of the bell-crank style, the same being pivoted to the side of the removable partition at the points 2 2. It will be understood that by taking hold of the handle or grasp $c$, Fig. 2, and pushing it in either direction the bell-crank levers will be rocked and through the medium of the connecting-links $b\,b$ the bar D' will be lifted or lowered, as the case may be, and the gates D raised or lowered to a degree corresponding with the extent to which the levers have been rocked. It will thus be seen that the size of the openings or gateways through which the fertilizer is fed to the openings C may be varied by the operator.

The gates D are constructed of spring metal and are made slightly narrower than the openings or gateways C'', as seen in Fig. 2. By this arrangement should the gateway become choked or stopped up or should any hard substance—such as a bone, stone, or loose nut or any other substance which could not pass under the gate—be pushed forward by the feed-plate the gate is enabled to give and permit such unusual substance to pass under it without damage to the parts, such as breaking of the gates or fingers of the feed-plates. This is a very essential feature of my invention and is applicable to any style of fertilizer-feed.

I do not wish to limit myself to a construction in which the gates are made of spring metal, as it is apparent that any construction which will permit the outward yielding of the gate will answer the purpose and will be within the spirit of my invention.

With my adjustable gates as above described I use a positive force-feed with a generally constant speed, the adjustment of the gates being depended upon to determine the rate of feed. When the operator has ascertained the quantity of fertilizing material that he wishes to be fed, he adjusts the gates so as to leave the desired opening and then locks the gates in place by the thumb-screw or butterfly-nut, which is provided as a pivotal point for the lever a and which may be screwed up and the lever thus clamped against the side of the board C'. Of course by thus locking lever a the lever a' is locked in place or held in place by reason of the connecting-rod E.

Another part of my invention relates to the construction and arrangement of the feed-plates employed, the construction being more clearly set forth in the sectional view shown in Fig. 3 and in Figs. 4 and 5. In the use of feed-plates as heretofore constructed the material frequently becomes lodged beneath and works under the plate, which it will be readily understood is very objectionable and conducive to bad results. Dust also collects in the bearings and increases the friction of operation. To prevent the material from working its way beneath the feed-plate, I prefer to construct the plate F with depending fingers F' of any desired number, and the bottom of the hopper is provided with an annular groove F'', in which these fingers work, as clearly shown in the drawings. The groove F'' in the bottom of the hopper is in line with the opening C in the hopper-bottom through which the material fed from the hopper drops, and should any material work its way partly beneath the feed-plate F it will fall into the groove F'', and these fingers F' will scrape the material along through the groove to the opening through which it will be discharged. It will thus be seen that material is prevented from working entirely beneath the feed-plate and there becoming wedged, and thus causing considerable friction and strain on the parts. A bearing for the feed-plate is formed by an annular plate or disk G, which is provided with a depending sleeve or collar which fits within an opening in the hopper-bottom.

H is the journal which fits within the opening in the disk G and is supported therein by means of a flanged collar e, which rests in an annular recess in the top of the plate G. The journal H has square ends, the upper one fitting within a square opening h on the under side of the feed-plate F, to which it is secured by means of a cap-screw g, which passes through the boss F''', in which said square opening is formed, and thence into the end of the journal. A bevel-gear J fits over the lower end of the journal and is held in place by means of a cotter-pin, bearing at its upper side against the shoulder formed by the junction of the square and round part of the journal. I thus have a very strong and rigid connection between the feed-plate and the bevel-gear J and a very simple and almost frictionless bearing, which is also dust-proof, as any dust which gets under the edge of the feed-plate would only get so far as the groove F'' and would then be carried to the opening C just as in the case of any fertilizer which gets under said plate. This bearing is readily oiled by simply removing the cap-screw g, and it is apparent that any oil applied at this point will work itself through all parts of the bearing.

The bevel-gears J are operated in the usual manner by bevel-gears K, secured to the rod L, running under and the length of the hopper and operated by a sprocket-chain.

I have thus described my invention in the manner in which I prefer to use it; but I do not wish to limit myself to the arrangement and construction thus specifically described.

It is apparent that either the whole of my invention may be used in its entirety or any parts of it may be adopted.

What I desire to claim as new and to cover by Letters Patent is—

1. In a hopper for grain-drills, in combination with openings in the bottom of the hopper leading to the grain-tubes and feed-plates conveying the fertilizer thereto, gateways through which the fertilizer is fed to said openings, and gates adapted to yield toward said openings, substantially as and for the purpose described.

2. In a hopper for grain-drills, in combination with openings in the bottom thereof leading to the grain-tubes, and feed-plates conveying the fertilizer thereto, gateways through which the fertilizer is fed to said openings, and gates yieldingly mounted in said gateways, substantially as and for the purpose described.

3. In a hopper for grain-drills, in combination with openings in the bottom of the hopper leading to the grain-tubes and feed-plates conveying the fertilizer thereto, gateways through which the fertilizer is fed to said openings, and spring-metal gates mounted in said gateways, substantially as and for the purpose described.

4. In a hopper for grain-drills, in combination with openings in the bottom thereof leading to the grain-tubes and feed-plates conveying the fertilizer thereto, a cut-off board provided with gateways leading to said openings, spring-metal gates of a width slightly less than that of the gateways slidably mounted before said gateways, and mechanism to raise and lower said gates, substantially as and for the purpose described.

5. In a hopper for grain-drills, in combination with openings in the bottom thereof leading to the grain-tubes, and feed-plates conveying the fertilizer thereto, a removable cut-off board provided with gateways leading to said openings, spring-metal gates of a width slightly less than that of the gateways sliding in a recess in said cut-off board and mechanism to raise and lower said gates, substantially as and for the purpose described.

6. In a hopper for grain-drills having a substantially flat bottom, an opening in said bottom leading to the grain-tube, an annular groove in said bottom communicating with said opening, a feed-plate with its lower face bearing on said bottom above said annular groove, and downwardly-projecting fingers on the lower surface of said feed-plate, said fingers working in said annular groove, substantially as and for the purpose described.

7. In a hopper for grain-drills, an annular plate provided with a downwardly-depending sleeve projecting through the bottom of the hopper and secured thereto, said annular plate being recessed on its upper side, a journal provided with a collar which fits in said recess and having square ends, a feed-plate having a square opening which fits over the upper end of said journal and secured thereto by a cap-screw and a bevel-gear secured to the other end of said journal and bearing on its upper side against the shoulder formed at the junction between the square and round portions of the journal, substantially as and for the purpose described.

8. In a hopper for grain-drills, an annular plate provided with a downwardly-depending sleeve projecting through the bottom of the hopper and secured thereto, and having an annular recess at its upper inside edge, a journal fitting within said sleeve and provided with a collar which rests in said recess, said journal having square ends, a feed-plate having a square opening which fits over the upper end of said journal, being secured thereto by means of a cap-screw, and a bevel-gear secured to the lower end of said journal and bearing against the shoulder formed by the round portion thereof, substantially as and for the purpose described.

9. In a hopper for grain-drills, openings leading to the grain-tubes, an annular recess in said bottom leading into the said opening, a feed-plate provided with depending lugs working in said annular recess, a journal provided with a square end which fits in a corresponding recess in said feed-plate to which it is secured by means of a cap-screw and means for supporting said journal in the bottom of the hopper, substantially as and for the purpose described.

HENRY C. HAM.

Witnesses:
CLARENCE E. MEHLHOPE,
EDWARD HAAT.